United States Patent
Di et al.

(10) Patent No.: US 10,355,789 B2
(45) Date of Patent: Jul. 16, 2019

(54) INTERFERENCE REDUCTION METHOD AND APPARATUS

(71) Applicant: HUAWEI TECHNOLOGIES CO., LTD., Shenzhen, Guangdong (CN)

(72) Inventors: Wei Di, Shanghai (CN); Lihong Ma, Shenzhen (CN); Tianpeng Wang, Shanghai (CN); Yangbang Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/745,917

(22) PCT Filed: Jul. 21, 2015

(86) PCT No.: PCT/CN2015/084711
§ 371 (c)(1),
(2) Date: Jan. 18, 2018

(87) PCT Pub. No.: WO2017/012074
PCT Pub. Date: Jan. 26, 2017

(65) Prior Publication Data
US 2018/0212689 A1  Jul. 26, 2018

(51) Int. Cl.
*H04B 1/10* (2006.01)
*H04B 15/00* (2006.01)
(Continued)

(52) U.S. Cl.
CPC .......... *H04B 15/00* (2013.01); *G09G 3/2096* (2013.01); *G09G 3/36* (2013.01); *H04B 1/10* (2013.01);
(Continued)

(58) Field of Classification Search
CPC .. H04B 1/10; H04B 15/00; H04B 2001/1045; H04B 2215/00
See application file for complete search history.

(56) References Cited

U.S. PATENT DOCUMENTS

2012/0202477 A1* 8/2012 Eriksson ............... H04L 1/0021
455/419
2012/0244871 A1* 9/2012 Zhao ..................... H04W 16/10
455/452.1
(Continued)

FOREIGN PATENT DOCUMENTS

CN  101369830 A  2/2009
CN  102246420 A  11/2011
(Continued)

OTHER PUBLICATIONS

Chinese Office Action issued in Chinese Application No. 201580030214.6 dated Jul. 4, 2018, 27 pages.
(Continued)

*Primary Examiner* — Simon Nguyen
(74) *Attorney, Agent, or Firm* — Fish & Richardson P.C.

(57) ABSTRACT

The present disclosure provides an interference reduction method and apparatus. The method includes obtaining a current communication frequency of a radio frequency system of an electronic device; and determining a first operating frequency of a first interface of the electronic device according to the current communication frequency, wherein a current radio frequency communication frequency of a current serving cell of the radio frequency system is not a multiple of a divide-by-four frequency of the first operating frequency.

14 Claims, 4 Drawing Sheets

(51) Int. Cl.
  *G09G 3/20* (2006.01)
  *G09G 3/36* (2006.01)
(52) U.S. Cl.
  CPC ..... *G09G 2330/06* (2013.01); *G09G 2370/10* (2013.01)

(56) References Cited

U.S. PATENT DOCUMENTS

| | | | | |
|---|---|---|---|---|
| 2014/0010129 | A1* | 1/2014 | Rubin | H04W 16/14 370/280 |
| 2014/0218352 | A1 | 8/2014 | Zhao et al. | |
| 2014/0256331 | A1* | 9/2014 | Adachi | H04J 11/003 455/447 |
| 2015/0296540 | A1* | 10/2015 | Yum | H04B 7/024 370/329 |
| 2016/0037525 | A1* | 2/2016 | Malmirchegini | H04W 24/02 370/329 |
| 2016/0249364 | A1* | 8/2016 | Siomina | H04W 72/082 |
| 2017/0005740 | A1* | 1/2017 | Yang | H04B 17/309 |

FOREIGN PATENT DOCUMENTS

| | | |
|---|---|---|
| CN | 103379643 A | 10/2013 |
| CN | 103442144 A | 12/2013 |
| CN | 103684489 A | 3/2014 |
| CN | 103780273 A | 5/2014 |
| CN | 103974267 A | 8/2014 |
| CN | 104104453 A | 10/2014 |
| CN | 104282286 A | 1/2015 |

OTHER PUBLICATIONS

International Search Report in International Application No. PCT/CN2015/084711, dated Apr. 22, 2016, 10 pages.

* cited by examiner

INTERFERENCE REDUCTION METHOD AND APPARATUS

CROSS-REFERENCE TO RELATED APPLICATIONS

This application is a National Stage of International Application No. PCT/CN2015/084711, filed on Jul. 21, 2015, which is hereby incorporated by reference in its entirety.

TECHNICAL FIELD

The present invention relates to the field of electronic technologies, and in particular, to an interference reduction method and apparatus.

BACKGROUND

As electronic devices develop, electronic devices can implement a growing number of functions. Therefore, relatively much data is frequently transmitted between internal components of electronic devices. The data is transmitted between the internal components at a specific operating frequency, and a divide-by-four frequency of the operating frequency and a multiplied frequency of the divide-by-four frequency may fall within a communications band of a radio frequency system. Consequently, communication of the radio frequency system is interfered, and wireless sensitivity is affected.

Particularly, it is more likely to cause interference as a communications band of a radio frequency system becomes wider.

SUMMARY

Embodiments of the present invention provide an interference reduction method and apparatus, to resolve a prior-art technical problem that a divide-by-four frequency of an operating frequency of another data interface and a multiplied frequency of the divide-by-four frequency cause interference to communication of a radio frequency system.

A first aspect of the present invention provides an interference reduction method, including:

obtaining a current communication frequency of a radio frequency system of an electronic device; and determining a first operating frequency of a first interface of the electronic device according to the current communication frequency, so that a current radio frequency communication frequency of a current serving cell of the radio frequency system is in a non-frequency multiplication relationship with a divide-by-four frequency of the first operating frequency and a multiplied frequency of the divide-by-four frequency.

With reference to the first aspect, in a first possible implementation of the first aspect, the current communication frequency includes the current radio frequency communication frequency; and the determining a first operating frequency of a first interface of the electronic device according to the current communication frequency includes:

determining, in N preset interference sets, a first interference set that has no intersection with the current radio frequency communication frequency, where each interference set includes a divide-by-four frequency of a corresponding preset frequency and a multiplied frequency of the divide-by-four frequency, and N is a positive integer greater than or equal to 2; and determining a preset frequency corresponding to the first interference set as the first operating frequency.

With reference to the first possible implementation of the first aspect, in a second possible implementation of the first aspect, the determining, in N preset interference sets, a first interference set that has no intersection with the current radio frequency communication frequency includes:

determining, as the first interference set, an interference set in the N interference sets that has an intersection with neither the current radio frequency communication frequency nor a frequency set, where the frequency set is a frequency set of a current neighboring cell of the radio frequency system or a frequency set of a current serving cell of a secondary card in the radio frequency system.

With reference to the second possible implementation of the first aspect, in a third possible implementation of the first aspect, the determining, in N preset interference sets, a first interference set that has no intersection with the current radio frequency communication frequency further includes:

if there is no interference set that has an intersection with neither the current radio frequency communication frequency nor the frequency set, determining, as the first interference set, an interference set in the N interference sets that has no intersection with the current radio frequency communication frequency and has fewest intersections with the frequency set.

With reference to any one of the first possible implementation of the first aspect to the third possible implementation of the first aspect, in a fourth possible implementation of the first aspect, the corresponding preset frequency is set for each interference set, so that there is always at least one interference set in the N interference sets that has no intersection with the current radio frequency communication frequency.

With reference to the first aspect, in a fifth possible implementation of the first aspect, the current communication frequency is the current radio frequency communication frequency; and the determining a first operating frequency of a first interface of the electronic device according to the current communication frequency includes:

determining the first operating frequency according to a current operating frequency of the first interface and the current radio frequency communication frequency, so that the current radio frequency communication frequency is in a non-frequency multiplication relationship with the divide-by-four frequency of the first operating frequency and the multiplied frequency of the divide-by-four frequency.

With reference to the fifth possible implementation of the first aspect, in a sixth possible implementation of the first aspect, the determining the first operating frequency according to a current operating frequency of the first interface and the current radio frequency communication frequency includes:

obtaining a first positive integer according to the current operating frequency and the current radio frequency communication frequency, where the first positive integer is a value of floor(current radio frequency communication frequency/divide-by-four frequency of the current operating frequency); and determining a quotient of current radio frequency communication frequency×4/(first positive integer+n.5) as the first operating frequency, where n is 0 or a positive integer, and a value of n enables the first operating frequency to be a frequency at which the first interface can work normally.

With reference to the fifth possible implementation of the first aspect, in a seventh possible implementation of the first aspect, the determining the first operating frequency according to a current operating frequency of the first interface and the current radio frequency communication frequency includes:

obtaining a second positive integer according to the current operating frequency and the current radio frequency communication frequency, where the second positive integer is a value of round(current radio frequency communication frequency/divide-by-four frequency of the current operating frequency);

determining a frequency difference, where the frequency difference is an absolute value of current radio frequency communication frequency−current operating frequency×second positive integer/4; and if the frequency difference is greater than a first preset value, determining the current operating frequency as the first operating frequency, where the first preset value is no less than half bandwidth of the current radio frequency communication frequency; or if the frequency difference is less than or equal to the first preset value, determining that a new operating frequency is a product of (current radio frequency communication frequency+second preset value)×4/second positive integer, and determining the new operating frequency as the first operating frequency, where the second preset value is greater than or equal to the first preset value.

With reference to the seventh possible implementation of the first aspect, in an eighth possible implementation of the first aspect, before the determining the new operating frequency as the first operating frequency, the method further includes:

determining that a difference between the new operating frequency and a supported minimum frequency is less than or equal to frequency bandwidth to which the first interface can be changed.

With reference to the first aspect, in a ninth possible implementation of the first aspect, the current communication frequency is the current radio frequency communication frequency and a frequency set of a current neighboring cell; and the determining a first operating frequency of a first interface of the electronic device according to the current communication frequency includes:

determining the first operating frequency according to a current operating frequency of the first interface, the current radio frequency communication frequency, and the frequency set, so that the current radio frequency communication frequency is in a non-frequency multiplication relationship with the divide-by-four frequency of the first operating frequency and the multiplied frequency of the divide-by-four frequency.

With reference to the ninth possible implementation of the first aspect, in a tenth possible implementation of the first aspect, the determining the first operating frequency according to a current operating frequency of the first interface, the current radio frequency communication frequency, and the frequency set includes:

obtaining a first positive integer according to the current operating frequency and the current radio frequency communication frequency, where the first positive integer is a value of floor(current radio frequency communication frequency/divide-by-four frequency of the current operating frequency);

obtaining a first lower limit value and a first upper limit value, where the first upper limit value is a value of (current radio frequency communication frequency−second preset value)×4/first positive integer, and the first lower limit value is a value of (current radio frequency communication frequency+second preset value)×4/(first positive integer+1);

determining a frequency difference, where the frequency difference is a quotient of First preset value×4/first positive integer, the first preset value is no less than half bandwidth of the current radio frequency communication frequency, and the second preset value is greater than or equal to the first preset value;

determining a new frequency set according to the frequency set, the first positive integer, the current radio frequency communication frequency, and the current operating frequency, where the new frequency set is the frequency set×4/(first positive integer+1+floor(the frequency set−current communication frequency)/divide-by-four frequency of the current operating frequency);

removing, in a first interval from the first lower limit value to the first upper limit value, a second interval whose lower limit endpoint value is a difference between the new frequency set and the frequency difference and whose upper limit endpoint value is a sum of the new frequency set and the frequency difference; and if a remaining frequency set within the first interval is not empty, determining, as the first operating frequency, a frequency that is in the remaining frequency set and that is the closest to an average of the first lower limit value and first upper limit value.

With reference to the ninth possible implementation of the first aspect, in an eleventh possible implementation of the first aspect, the current radio frequency communication frequency and the frequency set form a large frequency set, and the determining the first operating frequency according to a current operating frequency of the first interface, the current radio frequency communication frequency, and the frequency set includes:

determining a divide-by-four frequency of the current operating frequency;

determining a second positive integer that is consistent with a quantity of frequencies in the large frequency set, where the second positive integer is a value of floor(frequency in the large frequency set/divide-by-four frequency)+1;

determining a frequency difference between each frequency in the large frequency set and a multiplied frequency of a next divide-by-four frequency of the current operating frequency, where the frequency difference is a value of (current operating frequency×second positive integer−frequency corresponding to the second positive integer) % divide-by-four frequency;

if the frequency difference is greater than a first preset value and less than a difference between the divide-by-four frequency and the first preset value, determining the current operating frequency as the first operating frequency, where the first preset value is no less than half bandwidth of the current radio frequency communication frequency; or if the frequency difference is less than or equal to the first preset value, or the frequency difference is greater than or equal to the difference between the divide-by-four frequency and the first preset value, determining that a new operating frequency is (frequency corresponding to the frequency difference+second preset value)×4/second positive integer corresponding to the frequency difference, where the second preset value is greater than or equal to the first preset value; and determining the new operating frequency as the first operating frequency.

With reference to the eleventh possible implementation of the first aspect, in a twelfth possible implementation of the first aspect, before the determining the new operating frequency as the first operating frequency, the method further includes:

determining that a difference between the new operating frequency and a supported minimum frequency is less than or equal to frequency bandwidth to which the first interface can be changed.

A second aspect of the present invention provides an operating frequency switching method, including:

receiving an operating frequency switching instruction, where the switching instruction includes a new operating frequency of a mobile industry processor interface MIPI;

restarting a display serial interface DSI controller when a display enters a blanking zone, so as to clear configuration information of a time sequence register of the DSI controller;

calculating new configuration information of the time sequence register according to the new operating frequency; and configuring the time sequence register according to the new configuration information.

With reference to the second aspect, in a first possible implementation of the second aspect, before the restarting a display serial interface DSI controller, the method further includes:

disabling interrupt enable; and after the configuring the time sequence register according to the new configuration information, the method further includes:

enabling the interrupt enable.

A third aspect of the present invention provides an electronic device, including:

a radio frequency system, used for communication between the electronic device and an external electronic device;

a first interface, used for data transmission between internal components of the electronic device; and a processor, configured to: obtain a current communication frequency of the radio frequency system; and determine a first operating frequency of the first interface of the electronic device according to the current communication frequency, so that a current radio frequency communication frequency of a current serving cell of the radio frequency system is in a non-frequency multiplication relationship with a divide-by-four frequency of the first operating frequency and a multiplied frequency of the divide-by-four frequency.

With reference to the third aspect, in a first possible implementation of the third aspect, the current communication frequency includes the current radio frequency communication frequency, and the processor is configured to: determine, in N preset interference sets, a first interference set that has no intersection with the current radio frequency communication frequency, where each interference set includes a divide-by-four frequency of a corresponding preset frequency and a multiplied frequency of the divide-by-four frequency, and N is a positive integer greater than or equal to 2; and determine a preset frequency corresponding to the first interference set as the first operating frequency.

With reference to the first possible implementation of the third aspect, in a second possible implementation of the third aspect, the processor is configured to determine, as the first interference set, an interference set in the N interference sets that has an intersection with neither the current radio frequency communication frequency nor a frequency set, where the frequency set is a frequency set of a current neighboring cell of the radio frequency system or a frequency set of a current serving cell of a secondary card in the radio frequency system.

With reference to the second possible implementation of the third aspect, in a third possible implementation of the third aspect, the processor is further configured to: if there is no interference set that has an intersection with neither the current radio frequency communication frequency nor the frequency set, determine, as the first interference set, an interference set in the N interference sets that has no intersection with the current radio frequency communication frequency and has fewest intersections with the frequency set.

With reference to any one of the first possible implementation of the third aspect to the third possible implementation of the third aspect, in a fourth possible implementation of the third aspect, the corresponding preset frequency is set for each interference set, so that there is always at least one interference set in the N interference sets that has no intersection with the current radio frequency communication frequency.

With reference to the third aspect, in a fifth possible implementation of the third aspect, the current communication frequency is the current radio frequency communication frequency, and the processor is configured to determine the first operating frequency according to a current operating frequency of the first interface and the current radio frequency communication frequency, so that the current radio frequency communication frequency is in a non-frequency multiplication relationship with the divide-by-four frequency of the first operating frequency and the multiplied frequency of the divide-by-four frequency.

With reference to the fifth possible implementation of the third aspect, in a sixth possible implementation of the third aspect, the processor is configured to: obtain a first positive integer according to the current operating frequency and the current radio frequency communication frequency, where the first positive integer is a value of floor(current radio frequency communication frequency/divide-by-four frequency of the current operating frequency); and determine a quotient of current radio frequency communication frequency×4/(first positive integer+n.5) as the first operating frequency, where n is 0 or a positive integer, and a value of n enables the first operating frequency to be a frequency at which the first interface can work normally.

With reference to the fifth possible implementation of the third aspect, in a seventh possible implementation of the third aspect, the processor is configured to obtain a second positive integer according to the current operating frequency and the current radio frequency communication frequency, where the second positive integer is a value of round(current radio frequency communication frequency/divide-by-four frequency of the current operating frequency);

determine a frequency difference, where the frequency difference is an absolute value of current radio frequency communication frequency−current operating frequency× second positive integer/4; and if the frequency difference is greater than a first preset value, determine the current operating frequency as the first operating frequency, where the first preset value is no less than half bandwidth of the current radio frequency communication frequency; or if the frequency difference is less than or equal to the first preset value, determine that a new operating frequency is a product of (current radio frequency communication frequency+second preset value)×4/second positive integer, and determine the new operating frequency as the first operating frequency, where the second preset value is greater than or equal to the first preset value.

With reference to the seventh possible implementation of the third aspect, in an eighth possible implementation of the third aspect, the processor is further configured to: before determining the new operating frequency as the first operating frequency, determine that a difference between the new operating frequency and a supported minimum frequency is less than or equal to frequency bandwidth to which the first interface can be changed.

With reference to the third aspect, in a ninth possible implementation of the third aspect, the current communication frequency is the current radio frequency communication frequency and a frequency set of a current neighboring cell, and the processor is configured to determine the first operating frequency according to a current operating frequency of the first interface, the current radio frequency communication frequency, and the frequency set, so that the current radio frequency communication frequency is in a non-frequency multiplication relationship with the divide-by-four frequency of the first operating frequency and the multiplied frequency of the divide-by-four frequency.

With reference to the ninth possible implementation of the third aspect, in a tenth possible implementation of the third aspect, the processor is configured to: obtain a first positive integer according to the current operating frequency and the current radio frequency communication frequency, where the first positive integer is a value of floor(current radio frequency communication frequency/divide-by-four frequency of the current operating frequency);

obtain a first lower limit value and a first upper limit value, where the first upper limit value is a value of (current radio frequency communication frequency−second preset value)×4/first positive integer, and the first lower limit value is a value of (current radio frequency communication frequency+second preset value)×4/(first positive integer+1);

determine a frequency difference, where the frequency difference is a quotient of First preset value×4/first positive integer, the first preset value is no less than half bandwidth of the current radio frequency communication frequency, and the second preset value is greater than or equal to the first preset value;

determine a new frequency set according to the frequency set, the first positive integer, the current radio frequency communication frequency, and the current operating frequency, where the new frequency set is the frequency set×4/(first positive integer+1+floor(the frequency set−current communication frequency)/divide-by-four frequency of the current operating frequency);

remove, in a first interval from the first lower limit value to the first upper limit value, a second interval whose lower limit endpoint value is a difference between the new frequency set and the frequency difference and whose upper limit endpoint value is a sum of the new frequency set and the frequency difference; and if a remaining frequency set within the first interval is not empty, determine, as the first operating frequency, a frequency that is in the remaining frequency set and that is the closest to an average of the first lower limit value and first upper limit value.

With reference to the ninth possible implementation of the third aspect, in an eleventh possible implementation of the third aspect, the current radio frequency communication frequency and the frequency set form a large frequency set, and the processor is configured to: determine a divide-by-four frequency of the current operating frequency;

determine a second positive integer that is consistent with a quantity of frequencies in the large frequency set, where the second positive integer is a value of floor(frequency in the large frequency set/divide-by-four frequency)+1;

determine a frequency difference between each frequency in the large frequency set and a multiplied frequency of a next divide-by-four frequency of the current operating frequency, where the frequency difference is a value of (current operating frequency×second positive integer−frequency corresponding to the second positive integer) % divide-by-four frequency;

if the frequency difference is greater than a first preset value and less than a difference between the divide-by-four frequency and the first preset value, determine the current operating frequency as the first operating frequency, where the first preset value is no less than half bandwidth of the current radio frequency communication frequency; or if the frequency difference is less than or equal to the first preset value, or the frequency difference is greater than or equal to the difference between the divide-by-four frequency and the first preset value, determine that a new operating frequency is (frequency corresponding to the frequency difference+second preset value)×4/second positive integer corresponding to the frequency difference, where the second preset value is greater than or equal to the first preset value; and determine the new operating frequency as the first operating frequency.

With reference to the eleventh possible implementation of the third aspect, in a twelfth possible implementation of the third aspect, the processor is further configured to: before determining the new operating frequency as the first operating frequency, determine that a difference between the new operating frequency and a supported minimum frequency is less than or equal to frequency bandwidth to which the first interface can be changed.

A fourth aspect of the present invention provides an electronic device, including:
a display;
a mobile industry processor interface MIPI, connected to the display;
a display serial interface DSI controller; and
a processor, connected to the MIPI and the DSI controller, and configured to: receive an operating frequency switching instruction, where the switching instruction includes a new operating frequency of the MIPI; restart the DSI controller when the display enters a blanking zone, so as to clear configuration information of a time sequence register of the DSI controller; calculate new configuration information of the time sequence register according to the new operating frequency; and configure the time sequence register according to the new configuration information.

With reference to the fourth aspect, in a first possible implementation of the fourth aspect, the processor is further configured to: disable interrupt enable before restarting the display serial interface DSI controller, and enable the interrupt enable after configuring the time sequence register according to the new configuration information.

A fifth aspect of the present invention provides an interference reduction apparatus, including:
an obtaining unit, configured to obtain a current communication frequency of a radio frequency system of an electronic device; and
a processing unit, configured to determine a first operating frequency of a first interface of the electronic device according to the current communication frequency, so that a current radio frequency communication frequency of a current serving cell of the radio frequency system is in a non-frequency multiplication relationship with a divide-by-four frequency of the first operating frequency and a multiplied frequency of the divide-by-four frequency.

With reference to the fifth aspect, in a first possible implementation of the fifth aspect, the current communication frequency includes the current radio frequency communication frequency, and the processing unit is configured to: determine, in N preset interference sets, a first interference set that has no intersection with the current radio frequency communication frequency, where each interference set includes a divide-by-four frequency of a corresponding preset frequency and a multiplied frequency of the divide-by-four frequency, and N is a positive integer greater than or equal to 2; and determine a preset frequency corresponding to the first interference set as the first operating frequency.

With reference to the first possible implementation of the fifth aspect, in a second possible implementation of the fifth aspect, the processing unit is configured to: determine, as the first interference set, an interference set in the N interference sets that has an intersection with neither the current radio frequency communication frequency nor a frequency set, where the frequency set is a frequency set of a current neighboring cell of the radio frequency system or a frequency set of a current serving cell of a secondary card in the radio frequency system.

With reference to the second possible implementation of the fifth aspect, in a third possible implementation of the fifth aspect, the processing unit is configured to: if there is no interference set that has an intersection with neither the current radio frequency communication frequency nor the frequency set, determine, as the first interference set, an interference set in the N interference sets that has no intersection with the current radio frequency communication frequency and has fewest intersections with the frequency set.

With reference to any one of the first possible implementation of the fifth aspect to the third possible implementation of the fifth aspect, in a fourth possible implementation of the fifth aspect, the corresponding preset frequency is set for each interference set, so that there is always at least one interference set in the N interference sets that has no intersection with the current radio frequency communication frequency.

With reference to the fifth aspect, in a fifth possible implementation of the fifth aspect, the current communication frequency is the current radio frequency communication frequency, and the processing unit is configured to determine the first operating frequency according to a current operating frequency of the first interface and the current radio frequency communication frequency, so that the current radio frequency communication frequency is in a non-frequency multiplication relationship with the divide-by-four frequency of the first operating frequency and the multiplied frequency of the divide-by-four frequency.

With reference to the fifth possible implementation of the fifth aspect, in a sixth possible implementation of the fifth aspect, the processing unit is configured to: obtain a first positive integer according to the current operating frequency and the current radio frequency communication frequency, where the first positive integer is a value of floor(current radio frequency communication frequency/divide-by-four frequency of the current operating frequency); and determine a quotient of current radio frequency communication frequency×4/(first positive integer+n.5) as the first operating frequency, where n is 0 or a positive integer, and a value of n enables the first operating frequency to be a frequency at which the first interface can work normally.

With reference to the fifth possible implementation of the fifth aspect, in a seventh possible implementation of the fifth aspect, the processing unit is configured to obtain a second positive integer according to the current operating frequency and the current radio frequency communication frequency, where the second positive integer is a value of round(current radio frequency communication frequency/divide-by-four frequency of the current operating frequency);

determine a frequency difference, where the frequency difference is an absolute value of current radio frequency communication frequency−current operating frequency× second positive integer/4; and if the frequency difference is greater than a first preset value, determine the current operating frequency as the first operating frequency, where the first preset value is no less than half bandwidth of the current radio frequency communication frequency; or if the frequency difference is less than or equal to the first preset value, determine that a new operating frequency is a product of (current radio frequency communication frequency+second preset value)×4/second positive integer, and determine the new operating frequency as the first operating frequency, where the second preset value is greater than or equal to the first preset value.

With reference to the seventh possible implementation of the fifth aspect, in an eighth possible implementation of the fifth aspect, the processing unit is further configured to: before determining the new operating frequency as the first operating frequency, determine that a difference between the new operating frequency and a supported minimum frequency is less than or equal to frequency bandwidth to which the first interface can be changed.

With reference to the fifth aspect, in a ninth possible implementation of the fifth aspect, the current communication frequency is the current radio frequency communication frequency and a frequency set of a current neighboring cell, and the processing unit is configured to determine the first operating frequency according to a current operating frequency of the first interface, the current radio frequency communication frequency, and the frequency set, so that the current radio frequency communication frequency is in a non-frequency multiplication relationship with the divide-by-four frequency of the first operating frequency and the multiplied frequency of the divide-by-four frequency.

With reference to the ninth possible implementation of the fifth aspect, in a tenth possible implementation of the fifth aspect, the processing unit is configured to: obtain a first positive integer according to the current operating frequency and the current radio frequency communication frequency, where the first positive integer is a value of floor(current radio frequency communication frequency/divide-by-four frequency of the current operating frequency); obtain a first lower limit value and a first upper limit value, where the first upper limit value is a value of (current radio frequency communication frequency−second preset value)×4/first positive integer, and the first lower limit value is a value of (current radio frequency communication frequency+second preset value)×4/(first positive integer+1);

determine a frequency difference, where the frequency difference is a quotient of First preset value×4/first positive integer, the first preset value is no less than half bandwidth of the current radio frequency communication frequency, and the second preset value is greater than or equal to the first preset value;

determine a new frequency set according to the frequency set, the first positive integer, the current radio frequency communication frequency, and the current operating frequency, where the new frequency set is the frequency set×4/(first positive integer+1+floor(the frequency set−current communication frequency)/divide-by-four frequency of the current operating frequency);

remove, in a first interval from the first lower limit value to the first upper limit value, a second interval whose lower limit endpoint value is a difference between the new frequency set and the frequency difference and whose upper limit endpoint value is a sum of the new frequency set and the frequency difference; and if a remaining frequency set within the first interval is not empty, determine, as the first operating frequency, a frequency that is in the remaining frequency set and that is the closest to an average of the first lower limit value and first upper limit value.

With reference to the ninth possible implementation of the fifth aspect, in an eleventh possible implementation of the fifth aspect, the current radio frequency communication frequency and the frequency set form a large frequency set, and the processing unit is configured to: determine a divide-by-four frequency of the current operating frequency; determine a second positive integer that is consistent with a quantity of frequencies in the large frequency set, where the second positive integer is a value of floor(frequency in the large frequency set/divide-by-four frequency)+1; determine a frequency difference between each frequency in the large frequency set and a multiplied frequency of a next divide-by-four frequency of the current operating frequency, where the frequency difference is a value of (current operating frequency×second positive integer−frequency corresponding to the second positive integer) % divide-by-four frequency; if the frequency difference is greater than a first preset value and less than a difference between the divide-by-four frequency and the first preset value, determine the current operating frequency as the first operating frequency, where the first preset value is no less than half bandwidth of the current radio frequency communication frequency; or if the frequency difference is less than or equal to the first preset value, or the frequency difference is greater than or equal to the difference between the divide-by-four frequency and the first preset value, determine that a new operating frequency is (frequency corresponding to the frequency difference+second preset value)×4/second positive integer corresponding to the frequency difference, where the second preset value is greater than or equal to the first preset value; and determine the new operating frequency as the first operating frequency.

With reference to the eleventh possible implementation of the fifth aspect, in a twelfth possible implementation of the fifth aspect, the processing unit is further configured to: before determining the new operating frequency as the first operating frequency, determine that a difference between the new operating frequency and a supported minimum frequency is less than or equal to frequency bandwidth to which the first interface can be changed.

A sixth aspect of the present invention provides an operating frequency switching apparatus, including:

a receiving unit, configured to receive an operating frequency switching instruction, where the switching instruction includes a new operating frequency of a mobile industry processor interface MIPI; and a processing unit, configured to: restart a display serial interface DSI controller when a display enters a blanking zone, so as to clear configuration information of a time sequence register of the DSI controller; calculate new configuration information of the time sequence register according to the new operating frequency; and configure the time sequence register according to the new configuration information.

With reference to the sixth aspect, in a first possible implementation of the sixth aspect, the processing unit is further configured to: disable interrupt enable before restarting the display serial interface DSI controller; and enable the interrupt enable after configuring the time sequence register according to the new configuration information.

One or more technical solutions provided in the embodiments of the present invention have at least the following technical effects or advantages:

In the embodiments of the present invention, a current communication frequency of a radio frequency system of an electronic device is obtained, and a first operating frequency of a first interface of the electronic device is determined according to the current communication frequency, so that a current radio frequency communication frequency of a current serving cell of the radio frequency system is in a non-frequency multiplication relationship with a divide-by-four frequency of the first operating frequency and a multiplied frequency of the divide-by-four frequency. In other words, according to the method in the embodiments of the present invention, a first operating frequency of a first interface is determined according to a current communication frequency, so that a current radio frequency communication frequency is in a non-frequency multiplication relationship with a divide-by-four frequency of the first operating frequency and a multiplied frequency of the divide-by-four frequency. In this way, when the first interface works at the first operating frequency, the divide-by-four frequency of the first operating frequency and the multiplied frequency of the divide-by-four frequency cause no interference to the current radio frequency communication frequency.

DESCRIPTION OF EMBODIMENTS

Embodiments of the present invention provide an interference reduction method and apparatus, to resolve a prior-art technical problem that a divide-by-four frequency of an operating frequency of another data interface and a multiplied frequency of the divide-by-four frequency cause interference to communication of a radio frequency system.

To resolve the foregoing technical problem, a general idea of the technical solutions of the embodiments of the present invention is as follows:

A first operating frequency of a first interface of an electronic device is determined according to a current communication frequency of a radio frequency system of the electronic device, so that a current radio frequency communication frequency of a current serving cell of the radio frequency system is in a non-frequency multiplication relationship with a divide-by-four frequency of the first operating frequency and a multiplied frequency of the divide-by-four frequency.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 1:
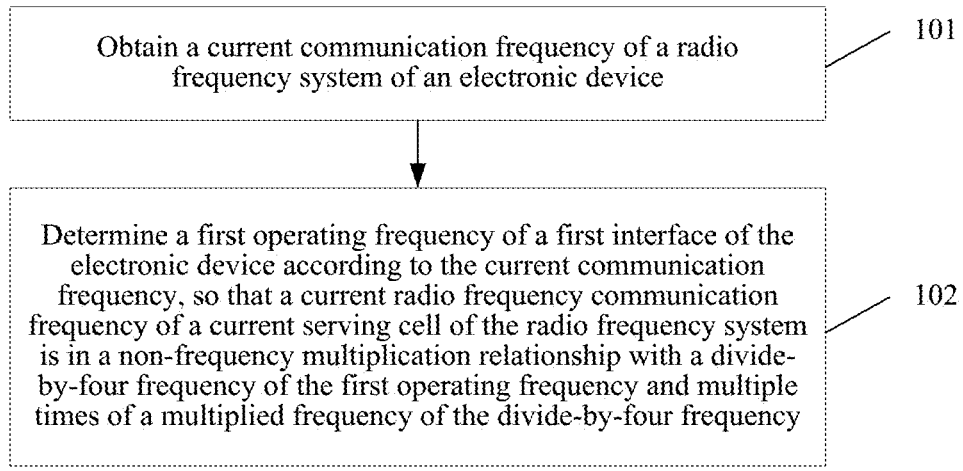
FIG. 1 is a flowchart of an interference reduction method according to an embodiment of the present invention.

Referring to FIG. 1, FIG. 1 is a flowchart of an interference reduction method according to an embodiment of the present invention. In this embodiment, the method may be applied to an electronic device. The electronic device is, for example, user equipment or a network-side device. The user equipment is, for example, a mobile phone, a tablet computer, or a notebook computer. The network-side device is, for example, a base station.

As shown in FIG. 1, the method includes the following steps:

Step 101: Obtain a current communication frequency of a radio frequency system of an electronic device.

Step 102: Determine a first operating frequency of a first interface of the electronic device according to the current communication frequency, so that a current radio frequency communication frequency of a current serving cell of the radio frequency system is in a non-frequency multiplication relationship with a divide-by-four frequency of the first operating frequency and a multiplied frequency of the divide-by-four frequency.

Specifically, the first interface may be a mobile industry processor interface (English: Mobile Industry Processor Interface, MIPI for short). In actual application, the first interface may be another interface. The another interface satisfies the following: A divide-by-four frequency of an operating frequency of the interface and a multiplied frequency of the divide-by-four frequency may cause interference to the current radio frequency communication frequency of the current serving cell of the radio frequency system of the electronic device.

It can be learned that, according to the method in this embodiment of the present invention, a first operating frequency of a first interface is determined according to a current communication frequency, so that a current radio frequency communication frequency is in a non-frequency multiplication relationship with a divide-by-four frequency of the first operating frequency and a multiplied frequency of the divide-by-four frequency. In this way, when the first interface works at the first operating frequency, the divide-by-four frequency of the first operating frequency and the multiplied frequency of the divide-by-four frequency cause no interference to the current radio frequency communication frequency.

To help a person skilled in the art understand how to implement the interference reduction method in this embodiment, multiple embodiments are used in the following for description.

Embodiment 1

In this embodiment, the current communication frequency includes the current radio frequency communication frequency. Therefore, correspondingly, step 102 includes: determining, in N preset interference sets, a first interference set that has no intersection with the current radio frequency communication frequency, where each interference set includes a divide-by-four frequency of a corresponding preset frequency and a multiplied frequency of the divide-by-four frequency, and N is a positive integer greater than or equal to 2; and determining a preset frequency corresponding to the first interference set as the first operating frequency.

It should be noted that, although each interference set includes a divide-by-four frequency of a corresponding preset frequency and a multiplied frequency of the divide-by-four frequency, according to an actual situation, whether an interference set needs to include a divide-by-four frequency or a multiplied frequency may differ, and this depends on a frequency range that can be supported by the radio frequency system. Divide-by-four frequencies and multiplied frequencies of the divide-by-four frequencies may be included in an interference set provided that these divide-by-four frequencies and the multiplied frequencies of the divide-by-four frequencies are in the frequency range that can be supported by the radio frequency system. For example, when a communications standard of the radio frequency system is a Long Term Evolution (English: Long Term Evolution, LTE for short) system, the frequency range that can be supported by the radio frequency system is 700 MHz to 2700 MHz. It is assumed that a preset frequency is 480 MHz. In this case, a divide-by-four frequency is 120 MHz. 120 MHz is not within the frequency range that can be supported by LTE. Therefore, 120 MHz may not be included in an interference set of the preset frequency. 22 times of the divide-by-four frequency is 2640 MHz, and 2640 MHz is within the frequency range of LTE. Therefore, 2640 MHz needs to be included in the interference set of the preset frequency. 23 times of the divide-by-four frequency is 2760 MHz, and 2760 MHz is beyond a maximum frequency range supported by LTE. Therefore, 2760 MHz may not be included in the interference set of the preset frequency.

Certainly, a preset frequency corresponding to each interference set is an operating frequency that can be supported by the first interface.

In actual application, the preset frequency may be set in multiple manners. For example, N preset frequencies are selected at random from operating frequencies that can be supported by the first interface. A person skilled in the art may set the preset frequency according to a requirement. In this embodiment, another method for setting the preset frequency is described.

First, an interference intersection band Bf (f1, f2, M) is defined. M represents a quantity of interference intersection bands, and is a positive integer. This is because interference intersection bands of any two frequencies are a series of bands instead of one single band. For example, when f1 is 200 MHz, and f2 is 240 MHz, a divide-by-four frequency of f1 is 50 MHz, and a divide-by-four frequency of f2 is 60 MHz. The two divide-by-four frequencies have intersections at frequencies such as 300 MHz, 600 MHz, and 900 MHz.

f1 represents a first preset frequency, and f2 represents a second preset frequency. It is assumed that f2 is greater than f1. An interference set of f1 is A1. An interference set of f2 is A2. There are a series of frequencies that satisfy: fa□A1, fb□A2, and (fa−fb)<b MHz. Such a frequency range is referred to as an interference intersection band of f1 and f2. b MHz is no less than half channel bandwidth in an available communications standard. For example, in a Global System for Mobile Communications (English: Global System for Mobile Communication, GSM for short), b is no less than 0.2. For the LTE system, b is no less than 10. Further, considering that interference has a specific width, a constraint condition may be added. That is, b is no less than half 6-dB bandwidth of an interference signal. The 6-dB bandwidth is a signal frequency width obtained after bandwidth of a signal is reduced by 6 dB from a maximum value.

The interference intersection band is distributed by using fcenter=f1×f2/(4×(f2−f1))×M (M=1, 2, 3 . . . ) as a center.

Preset frequencies are properly selected, so that there is no frequency that interferes with all preset frequencies. That is, when a pair of frequencies fc and fd are selected at random from preset frequencies f1 to fn, and an interference intersection band of fc and fd is Bf (fc, fd, m), there are definitely a pair of frequencies fe and ff in f1 to fn that enable Bf (fc, fd, m) to have no intersection with each Bf (fe, ff, M), where m is any value of M.

For ease of description, a specific example is provided in the following for description. It is assumed that preset frequencies are 462 MHz, 435 MHz, and 411 MHz.

A pair of frequencies: fc=462 MHz and fd=435 MHz are selected, and a center point of an interference intersection band of fc=462 MHz and fd=435 MHz is fcenter=1860.8× M. 16 times of a divide-by-four frequency of fc is 1848 MHz, 17 times of a divide-by-four frequency of fd is 1848.75, and 1848 is extremely close to 1848.75. If M is 1, fc and fd have an intersection near 1860.8 MHz. That is, if the current radio frequency communication frequency is 1848 MHz, these two frequencies cannot be excluded. In this case, in the preset frequencies, a pair of frequencies fe and ff are selected at random. For example, fe=462 MHz, and ff=411 MHz. A center point of an interference intersection band of fe and ff is fcenter=930.79×M, where M=1, 2, 3 . . . . This set sequence has an intersection with Bf (fc, fd, 1). When M is 2, the center point of the interference intersection band of fe and ff is 1861.6 MHz, which is extremely close to 1860.8 MHz, and therefore, there is an intersection.

However, if 411 MHz in the foregoing preset frequencies is replaced with 445 MHz, values of fc and fd are the same as those described above, fe=462 MHz, and ff=445 MHz, the center point of the interference intersection band of fe and ff is fcenter=3.23.38×M, and regardless of what integer M is, the center point has no intersection with an interference band set that centers on 1860.8 MHz. Therefore, 462 MHz, 435 MHz, and 445 MHz are a group of proper preset frequency values.

In the manner of setting preset frequencies in this embodiment, an interference set of preset frequencies that has no intersection with the current radio frequency communication frequency can be found. Certainly, the present invention does not exclude another setting manner, so that there is always at least one interference set in preset interference sets that has no intersection with the current radio frequency communication frequency.

After the N preset interference sets and the corresponding preset frequencies are described, how to determine the first interference set is described in detail in the following.

Specifically, when the current communication frequency includes only the current radio frequency communication frequency of the current serving cell of the radio frequency system, only the first interference set that has no intersection with the current radio frequency communication frequency needs to be determined.

If the current communication frequency further includes a frequency set, an interference set in the N interference sets that has an intersection with neither the current radio frequency communication frequency nor the frequency set is determined as the first interference set. The frequency set is a frequency set of a current neighboring cell of the radio frequency system or a frequency set of a current serving cell of a secondary card in the radio frequency system. Generally, when the radio frequency system has only a single card, the current radio frequency communication frequency is the current radio frequency communication frequency of the current serving cell, and the frequency set is the frequency set of the current neighboring cell. When the radio frequency system includes a primary card and a secondary card, the current radio frequency communication frequency is a current radio frequency communication frequency of a current serving cell of the primary card, and the frequency set is a frequency set of a current serving cell of the secondary card.

Figure 2A:
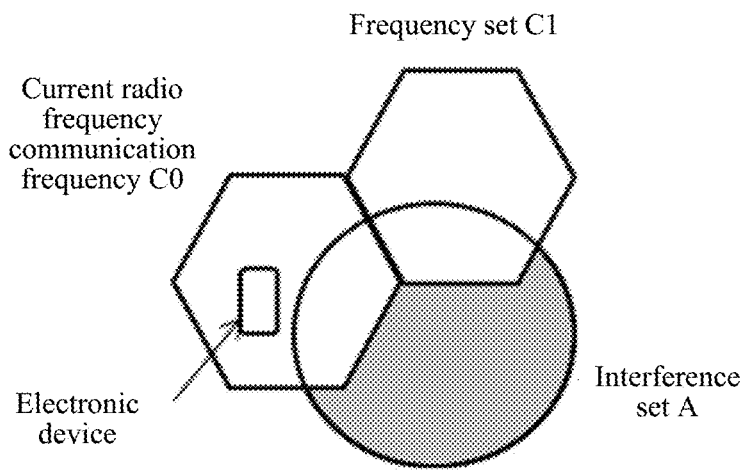
FIG. 2a and FIG. 2b are schematic diagrams of a process of determining a first operating frequency according to an embodiment of the present invention.

For example, referring to FIG. 2a, the current radio frequency communication frequency of the current serving cell is C0, the frequency set of the current neighboring cell is C1, and a shaded part represents an interference set A. It can be learned from FIG. 3a that the interference set A has an intersection with neither the current radio frequency communication frequency C0 nor the frequency set C1. Therefore, the interference set A may be determined as the first interference set, and further, a preset frequency corresponding to the interference set A may be determined as the first operating frequency.

After such setting, the divide-by-four frequency of the first operating frequency and the multiplied frequency of the divide-by-four frequency cause no interference to the current radio frequency communication frequency of the current serving cell of the radio frequency system.

Further, if there is no interference set that has an intersection with neither the current radio frequency communication frequency nor the frequency set, an interference set in the N interference sets that has no intersection with the current radio frequency communication frequency and has fewest intersections with the frequency set is determined as the first interference set.

Figure 2B:
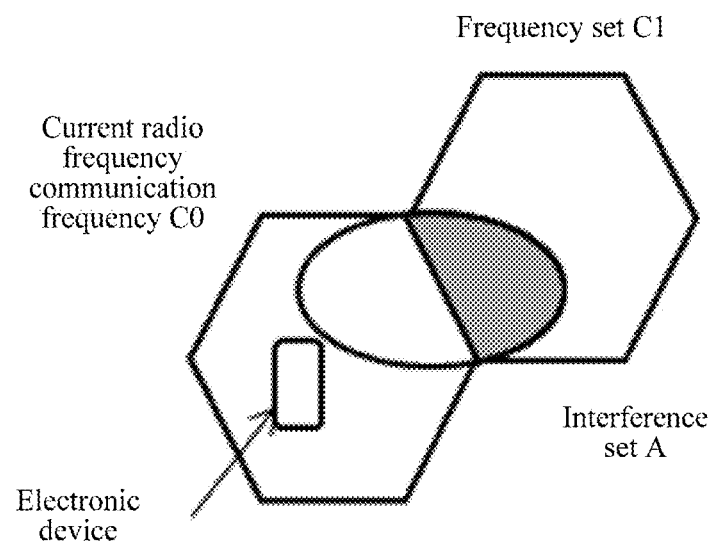

For example, refer to FIG. 2b. Similarly, a shaded part represents an interference set A. There is no interference set in the N interference sets that has an intersection with neither a current radio frequency communication frequency C1 nor a frequency set C2, and therefore, an interference set that has no intersection with the current radio frequency communication frequency C1 and fewest intersections with the frequency set C2 is determined as the first interference set.

In the foregoing cases, when there is more than one first interference set, a frequency with a highest priority in preset frequencies corresponding to first interference sets is selected as the first operating frequency. Certainly, in actual application, a first operating frequency may be selected at random, or one of multiple preset frequencies may be selected as the first operating frequency based on consideration of other factors.

In this embodiment, the first operating frequency is determined with reference to the frequency set at the same time. For a dual-card electronic device, a frequency set of a secondary card is considered, so that communication interference caused to the secondary card by an interference frequency generated by an operating frequency of the first interface can be avoided. However, for a single-card electronic device, a frequency set of a neighboring cell is considered. Because the electronic device is always in a moving state, and a current neighboring cell may be a serving cell at a next moment, the neighboring cell is protected to provide a relatively good cell handover environment.

Embodiment 2

In this embodiment, the current communication frequency is the current radio frequency communication frequency. Correspondingly, step 102 includes: determining the first operating frequency according to a current operating frequency of the first interface and the current radio frequency communication frequency, so that the current radio frequency communication frequency is in a non-frequency multiplication relationship with a divide-by-four frequency of the first operating frequency and a multiplied frequency of the divide-by-four frequency. In this embodiment, the current operating frequency of the first interface needs to be obtained.

A possible implementation of step 102 is: obtaining a first positive integer according to the current operating frequency and the current radio frequency communication frequency, where the first positive integer is a value of floor(current radio frequency communication frequency/divide-by-four frequency of the current operating frequency); and determining a quotient of current radio frequency communication frequency×4/(first positive integer+n.5) as the first operating frequency, where n is a positive integer, and a value of n enables the first operating frequency to be a frequency at which the first interface can work normally. The first operating frequency determined by using the method makes the current radio frequency communication frequency be always between two sub-frequencies of the first operating frequency that cause interference.

Specifically, the current operating frequency of the first interface is f0, and the current radio frequency communication frequency is fr. S=floor(fr/(f0/4)) is calculated, where floor( ) is a round down function. In this case, the first operating frequency f1=fr×4/(S+0.5). For example, when it is assumed that f0 is 480 MHz, and fr is 960 MHz, S is equal to 8, and f1 is: 960 MHz×4/(8+0.5)=451 MHz. Therefore, fr is not in a frequency multiplication relationship with a divide-by-four frequency of f1 or a multiplied frequency of the divide-by-four frequency, and neither the divide-by-four frequency of the first operating frequency f1 nor the multiplied frequency of the divide-by-four frequency cause interference to the current radio frequency communication frequency fr.

According to this method, the current radio frequency communication frequency is always between the divide-by-four frequency of the first operating frequency and the multiplied frequency of the divide-by-four frequency. Therefore, the divide-by-four frequency of the first operating frequency and the multiplied frequency of the divide-by-four frequency cause no interference to the current radio frequency communication frequency.

Another possible implementation of step 102 is: obtaining a second positive integer according to the current operating frequency and the current radio frequency communication frequency, where the second positive integer is a value of round(Current radio frequency communication frequency/divide-by-four frequency of the current operating frequency); determining a frequency difference, where the frequency difference is an absolute value of current radio frequency communication frequency−current operating frequency×second positive integer/4; and if the frequency difference is greater than a first preset value, determining the current operating frequency as the first operating frequency, where the first preset value is half bandwidth of the current radio frequency communication frequency; or if the frequency difference is less than or equal to the first preset value, determining that a new operating frequency is a product of (current radio frequency communication frequency+second preset value)×4/second positive integer, and determining the new operating frequency as the first operating frequency, where the second preset value is greater than or equal to the first preset value. According to this method, a frequency difference between the current radio frequency communication frequency and an interference frequency that is generated by the first operating frequency of the first interface is always greater than the first preset value. Therefore, no interference is caused to communication at the current radio frequency communication frequency.

Specifically, it is still assumed that the current operating frequency of the first interface is f0, and the current radio frequency communication frequency is fr. p=round(fr/(f0/4)) is calculated, where round( ) is a round off function. A frequency difference Δf=abs(fr−f0×p/4) is calculated, where abs( ) is an absolute value function. If Δf>3 MHz, the first operating frequency of the first interface is still the current operating frequency f0. 3 MHz is the first preset value, and may be another value in another embodiment, but is no less than half the bandwidth of the current radio frequency communication frequency fr.

If Δf<3 MHz, it is determined that the new operating frequency is (fr+5)×4/p. 5 is the second preset value. In actual application, the second preset value is greater than or equal to the first preset value. Therefore, 5 may be replaced with another second preset value. Then, the new operating frequency is determined as the first operating frequency.

Further, before the new operating frequency is determined as the first operating frequency, it is determined that a difference between the new operating frequency and a supported minimum frequency is less than or equal to frequency bandwidth to which the first interface can be changed. In other words, it is determined that the new operating frequency does not exceed a maximum operating frequency that can be supported by the first interface. In some cases, the frequency bandwidth to which the first interface can be changed is limited. Therefore, determining needs to be performed to ensure that the first interface works normally.

When the difference between the new operating frequency and the minimum frequency is greater than the frequency bandwidth to which the first interface can be changed, the foregoing location of f0 is replaced with the minimum frequency, and p and Δf are re-calculated. Then Δf is compared with the first preset value again. The foregoing process is repeatedly performed until a new operating frequency is obtained by means of calculation, where a difference between the new operating frequency and the minimum frequency does not exceed the frequency bandwidth to which the first interface can be changed.

According to this method, the difference between the current radio frequency communication frequency and the interference frequency that is generated by the first operating frequency is greater than the first preset value. Therefore, the interference frequency that is generated by the first operating frequency causes no interference to communication of the radio frequency system.

The foregoing description is merely an example for determining the first operating frequency according to the current operating frequency of the first interface and the current radio frequency communication frequency. In actual application, another calculation manner may be used, and this is not specifically limited in the present invention.

Embodiment 3

In this embodiment, the current communication frequency is the current radio frequency communication frequency and a frequency set of a current neighboring cell. Correspondingly, step 102 includes: determining the first operating frequency according to a current operating frequency of the first interface, the current radio frequency communication frequency, and the frequency set, so that the current radio frequency communication frequency is in a non-frequency multiplication relationship with the divide-by-four frequency of the first operating frequency and the multiplied frequency of the divide-by-four frequency.

Optionally, a possible implementation of step 102 is: obtaining a first positive integer according to the current operating frequency and the current radio frequency communication frequency, where the first positive integer is a value of floor(current radio frequency communication frequency/divide-by-four frequency of the current operating frequency);

obtaining a first lower limit value and a first upper limit value, where the first upper limit value is a value of (current radio frequency communication frequency−second preset value)×4/first positive integer, and the first lower limit value is a value of (current radio frequency communication frequency+second preset value)×4/(first positive integer+1);

determining a frequency difference, where the frequency difference is a quotient of First preset value×4/first positive integer;

determining a new frequency set according to the frequency set, the first positive integer, the current radio frequency communication frequency, and the current operating frequency, where the new frequency set is the frequency set×4/(first positive integer+1+floor(the frequency set−current communication frequency)/divide-by-four frequency of the current operating frequency);

removing, in a first interval from the first lower limit value to the first upper limit value, a second interval whose lower limit endpoint value is a difference between the new frequency set and the frequency difference and whose upper limit endpoint value is a sum of the new frequency set and the frequency difference; and if a remaining frequency set within the first interval is not empty, determining, as the first operating frequency, a frequency that is in the remaining frequency set and that is the closest to an average of the first lower limit value and first upper limit value.

For example, it is assumed that the current operating frequency is f0, the current radio frequency communication frequency is fr, and the frequency set of the current neighboring cell is fc(t), where t=1, 2, 3 . . . . A value of t depends on a quantity of neighboring cells of the current serving cell.

First step: The first positive integer is calculated: S=floor (fr/(f0/4)), where floor( ) is a round down function. The first upper limit value is calculated: fmipi_u=(fr−5 MHz)×4/S. The first lower limit value is calculated: fmipi_d=(fr+5 MHz)×4/(S+1). It is assumed that fr is 960 MHz, and f0 is 480 MHz. In this case, S is equal to 8, fmipi_d is 428.89 MHz, and fmipi_u is 477.5 MHz. 5 MHz is the second preset value and may be replaced with another value in another embodiment, provided that the another value is greater than or equal to the following first preset value.

Second step: The frequency difference is calculated: Δfmipi=3 MHz×4/S. 3 MHz is the first preset value, and is no less than half bandwidth of the current radio frequency communication frequency. The first preset value may be another value in another embodiment, and depends on the bandwidth of the current radio frequency communication frequency. In this embodiment, the frequency difference Δfmipi is 1.5 MHz.

Third step: The new frequency set is fmipi_c(0=fc(t)×4/ (S+1+floor(fc(t)−fr)/(f0/4)). It is assumed that there are two neighboring cells, fc(1) is 1880 MHz, and fc(2) is 2170 MHz. In this case, fmipi_c(1) is 470 MHz, and fmipi_c(2) is 456.84 MHz.

Fourth step: In an interval (fmipi_d, fmipi_u), an interval sequence (fmipi_c(m)−Δfmipi, fmipi_c(m)+Δfmipi) is removed. For example, in an interval (428.89 MHz, 477.5 MHz), an interval (456.84 MHz-1.5 MHz, 456.89 MHz+1.5 MHz) and an interval (477 MHz−1.5 MHz, 477 MHz+1.5 MHz) are removed. In this case, remaining frequency sets are (428.89 MHz, 455.04 MHz) excluding the upper endpoint, and (458.34 MHz, 475.5 MHz) excluding the lower endpoint.

Fifth step: In the remaining frequency sets, a frequency that is the closest to (fmipi_u+fmipi_d)/2 is determined as the first operating frequency. For example, (fmipi_u+ fmipi_d)/2 is 453.195 MHz. Therefore, in the remaining frequency sets, the frequency that is the closest to 453.195 MHz is 455.03 MHz.

Sixth step: If the remaining frequency set is empty, the last frequency in the frequency set of the neighboring cell is removed, and the fourth step and the fifth step are performed again.

According to this method, the current radio frequency communication frequency is always between the divide-by-four frequency of the first operating frequency and the multiplied frequency of the divide-by-four frequency. Therefore, the divide-by-four frequency of the first operating frequency and the multiplied frequency of the divide-by-four frequency cause no interference to the current radio frequency communication frequency.

For ease of description, the current radio frequency communication frequency and the frequency set form a large frequency set. Correspondingly, another possible implementation of step 102 is: determining a divide-by-four frequency of the current operating frequency;

determining a second positive integer that is consistent with a quantity of frequencies in the large frequency set, where the second positive integer is a value of floor(frequency in the large frequency set/divide-by-four frequency)+1;

determining a frequency difference between each frequency in the large frequency set and a multiplied frequency of a next divide-by-four frequency of the current operating frequency, where the frequency difference is a value of (current operating frequency×second positive integer−frequency corresponding to the second positive integer) % divide-by-four frequency;

if the frequency difference is greater than a first preset value and less than a difference between the divide-by-four frequency and the first preset value, determining the current operating frequency as the first operating frequency; or if the frequency difference is less than or equal to the first preset value, or the frequency difference is greater than or equal to the difference between the divide-by-four frequency and the first preset value, determining that a new operating frequency is a value of (Frequency corresponding to the frequency difference+second preset value)×4/second positive integer corresponding to the frequency difference; and determining the new operating frequency as the first operating frequency.

Optionally, before the new operating frequency is determined as the first operating frequency, it is further determined that a difference between the new operating frequency and a supported minimum frequency is less than or equal to frequency bandwidth to which the first interface can be changed. In some cases, the frequency bandwidth to which the first interface can be changed is limited. Therefore, determining needs to be performed to ensure that the first interface works normally.

For example, it is assumed that the current operating frequency is f0, the current radio frequency communication frequency is fr, and the frequency set of the current neighboring cell is fc(t), where t=1, 2, 3 . . . . A value of t depends on a quantity of neighboring cells of the current serving cell. For ease of description, a large frequency set fc(k) is defined, where fc(0) is fr, and k is at least 1, that is, fc(t).

First step: The divide-by-four frequency f_div 4 of f0 is determined. It is assumed that f0 is 480 MHz.

Second step: The second positive integer is calculated: n(k)=floor(fc(k)/(f0/4))+1, where floor( ) is a round down function, and k=0, 1, 2 . . . . It is assumed that fc(0), that is, fr is 960 MHz, fc(1) is 1880 MHz, and fc(2) is 2170 MHz. In this case, three second positive integers are obtained by means of calculation: n(0) is 9, n(1) is 16, and n(2) is 19.

Third step: The frequency difference between each frequency in fc(t) and a multiplied frequency of the next divide-by-four frequency of f0 is calculated: Δfc(k)=(f0×n(k)/4−fc(k))% f_div 4, where % is a modulo operation, and t=0, 1, 2 . . . . Therefore, Δfc(0)=0 MHz, Δfc(1) is 40 MHz, and Δfc(2) is 110 MHz.

Fourth step: Δfc(k) is determined, where k=0, 1, 2 . . . . If 3 MHz<Δfc(k)<f_div 4-3 MHz, it is determined that the first operating frequency is f0. 3 MHz represents the first preset value, and is no less than half bandwidth of fr. The first preset value may be another value in another embodiment, and depends on the bandwidth of fr. This is not specifically limited in the present invention.

If there is Δfc(p) (3 MHz, f_div 4-3 MHz), the new operating frequency is determined: f_tmp=(fc(p)+3 MHz)×4/n(p). 3 MHz herein is the second preset value, and the second preset value is greater than or equal to the first preset value. In another embodiment, another value may be used as the second preset value. This is not specifically limited in the present invention.

In this example, Δfc(0)=0 MHz and does not belong to an interval (3 MHz, f_div 4-3 MHz). Therefore, the new operating frequency is determined: f_tmp=(fc(0)+3)×4/n(0) =428 MHz.

Fifth step: If f_tmp−fb≤B, f_tmp is determined as the first operating frequency. If f_tmp−fb>B, f0 in the foregoing steps is replaced with fb, then re-calculation is performed from the second step, and a tag value turn=1 is set. fb is a supported minimum frequency, and B is a value of bandwidth change that can be supported by the first interface.

Sixth step: If f_tmp>f0, and turn=1, the last frequency in the frequency set of the neighboring cell is removed, and re-calculation is performed from the second step.

Seventh step: If f_tmp is less than or equal to f0, and turn is not equal to 1, re-calculation is performed from the second step by using f_tmp as f0.

It can be learned that, according to this method, a frequency difference between the current radio frequency communication frequency and an interference frequency that is generated by the first operating frequency is always greater than the first preset value. In other words, the interference frequency that is generated by the first operating frequency is always beyond bandwidth of the current radio frequency communication frequency. Therefore, the interference frequency that is generated by the first operating frequency causes no communication interference to the current radio frequency communication frequency.

The foregoing description is merely an example. In actual application, another algorithm may be used to determine the first operating frequency, and this is not specifically limited in the present invention.

Figure 3:
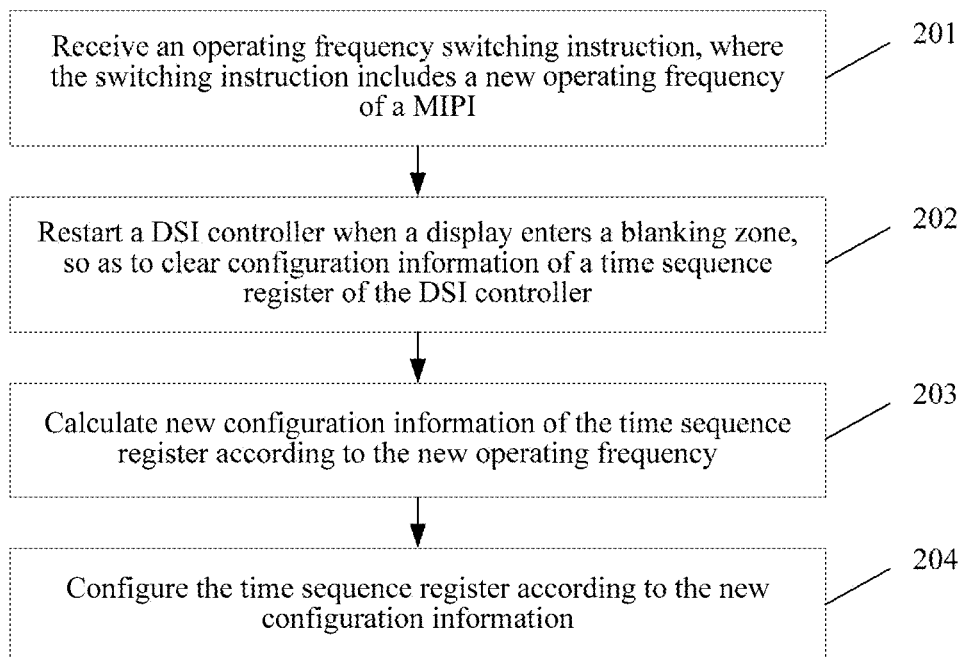
FIG. 3 is a flowchart of an operating frequency switching method according to an embodiment of the present invention.

Regardless of a method used to determine the first operating frequency, when the first operating frequency is inconsistent with the current operating frequency, an operating frequency of the first interface needs to be switched. Specifically, referring to FIG. 3, FIG. 3 is a flowchart of an operating frequency switching method according to an embodiment of the present invention. The method is used for switching an operating frequency of a MIPI interface. In this embodiment, the MIPI interface is connected to a display and a processor. The method includes the following steps:

Step 201: Receive an operating frequency switching instruction, where the switching instruction includes a new operating frequency of the MIPI.

Step 202: Restart a display serial interface (English: Display Serial Interface, DSI for short) controller when the display enters a blanking zone, so as to clear configuration information of a time sequence register of the DSI controller.

Step 203: Calculate new configuration information of the time sequence register according to the new operating frequency.

Step 204: Configure the time sequence register according to the new configuration information.

Specifically, after a first operating frequency is determined by using the foregoing method shown in FIG. 1, it is determined whether the first operating frequency is the same as a current operating frequency. If the first operating frequency is different from the current operating frequency, the operating frequency switching instruction is generated, and this is corresponding to step 201, that is, receiving the operating frequency switching instruction, where the switching instruction includes the new operating frequency of the MIPI.

It should be noted that the display refreshes and displays an image frame by frame during working. There needs to be a blanking zone between frames, and the blanking zone is used for performing processing such as synchronization. Therefore, in the solution in this embodiment, a frequency is switched in the blanking zone, so that not only normal working of the display is not affected and seamless switching is implemented, but also a user cannot perceive a frequency switching process and user experience is improved.

Optionally, restarting the DSI controller may be: DSI software is first powered off, and the DSI controller is closed; then, warm reset is performed on the DSI controller to restore to an initial status of being just powered on, so as to clear all configuration information of the time sequence register, and restore the time sequence register to an initial status.

Optionally, the configuration information of the time sequence register is configuration information related to an operating frequency of the MIPI. Specifically, the configuration information of the time sequence register may include information such as an operating frequency, a frame rate, a line frame rate, a control frame rate, and a duty cycle of the MIPI. This part of content is content well known to a person skilled in the art, and therefore, no other configuration information is listed herein.

Optionally, in step 203, the new configuration information of the time sequence register is calculated according to the new operating frequency. Specifically, the operating frequency of the MIPI is the new operating frequency. Manners of calculating the configuration information such as the frame rate, the line frame rate, the control frame rate, and the duty cycle are content well known to a person skilled in the art, and details are not described herein.

Optionally, before step 202, interrupt enable is further disabled until the time sequence register is re-configured in step 204, and no interrupt request is processed in a period in which the interrupt enable has not been enabled, so as to ensure successful frequency switching.

Based on a same inventive concept, an embodiment of the present invention provides an electronic device, so as to implement the method shown in FIG. 1. The electronic device is, for example, a mobile phone or a tablet computer.

Figure 4:
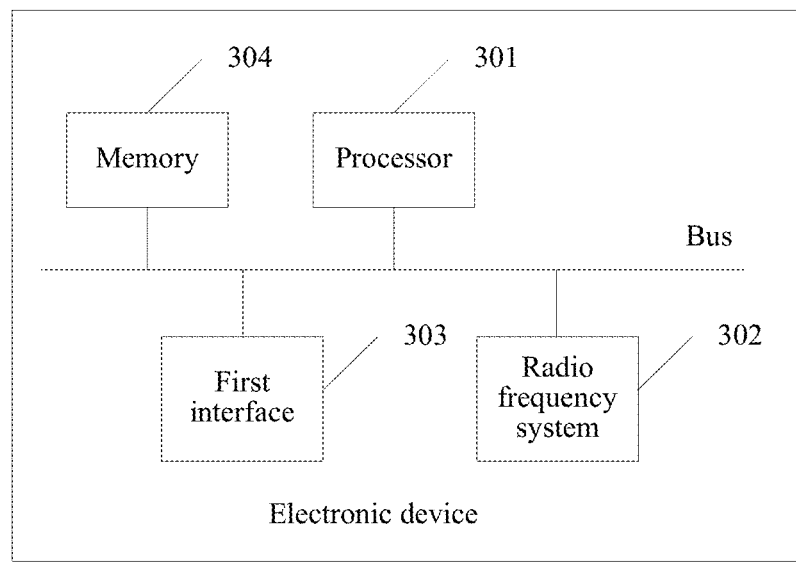
FIG. 4 is a structural block diagram of an electronic device according to an embodiment of the present invention.

As shown in FIG. 4, the electronic device includes a processor 301, a radio frequency system 302, a first interface 303, and a memory 304. The processor 301 may be specifically a central processing unit or an application-specific integrated circuit (English: Application Specific Integrated Circuit, ASIC for short), or may be one or more integrated circuits used to control program execution, or may be a hardware circuit developed by using a field programmable gate array (English: Field Programmable Gate Array, FPGA for short), or may be a baseband chip. There may be one or more memories 304. The memory 304 may include a read only memory (English: Read Only Memory, ROM for short), a random access memory (English: Random Access Memory, RAM for short), and a magnetic disk memory. The radio frequency system 302 includes a receiver and a transmitter. The receiver and the transmitter are configured to perform network communication with an external device, and specifically, may perform network communication with the external device by using a network such as an Ethernet, a radio access network, and a wireless local area network. The receiver and the transmitter may be two components physically independent of each other, or may be a same component physically.

These memories 304 and the radio frequency system 302 are connected to the processor 301 by using a bus.

The first interface 303 is used for data transmission between internal components of the electronic device, and may be, for example, a MIPI. For example, the MIPI is configured to connect the processor 301 to a display of the electronic device, or is configured to connect the processor 301 to a camera.

Specifically, the processor 301 is configured to: obtain a current communication frequency of the radio frequency system 302; and determine a first operating frequency of the first interface 303 of the electronic device according to the current communication frequency, so that a current radio frequency communication frequency of a current serving cell of the radio frequency system is in a non-frequency multiplication relationship with a divide-by-four frequency of the first operating frequency and a multiplied frequency of the divide-by-four frequency.

Optionally, the current communication frequency includes the current radio frequency communication frequency, and the processor 301 is configured to: determine, in N preset interference sets, a first interference set that has no intersection with the current radio frequency communication frequency, where each interference set includes a divide-by-four frequency of a corresponding preset frequency and a multiplied frequency of the divide-by-four frequency, and N is a positive integer greater than or equal to 2; and determine a preset frequency corresponding to the first interference set as the first operating frequency.

Optionally, the processor 301 is configured to determine, as the first interference set, an interference set in the N interference sets that has an intersection with neither the current radio frequency communication frequency nor a frequency set, where the frequency set is a frequency set of a current neighboring cell of the radio frequency system 302 or a frequency set of a current serving cell of a secondary card in the radio frequency system 302.

Optionally, the processor 301 is further configured to: if there is no interference set that has an intersection with neither the current radio frequency communication frequency nor the frequency set, determine, as the first interference set, an interference set in the N interference sets that has no intersection with the current radio frequency communication frequency and has fewest intersections with the frequency set.

Optionally, the corresponding preset frequency is set for each interference set, so that there is always at least one interference set in the N interference sets that has no intersection with the current radio frequency communication frequency.

Optionally, the current communication frequency is the current radio frequency communication frequency, and the processor 301 is configured to determine the first operating frequency according to a current operating frequency of the first interface 303 and the current radio frequency communication frequency, so that the current radio frequency communication frequency is in a non-frequency multiplication relationship with a divide-by-four frequency of the first operating frequency and a multiplied frequency of the divide-by-four frequency.

Optionally, the processor 301 is configured to obtain: a first positive integer according to the current operating frequency and the current radio frequency communication frequency, where the first positive integer is a value of floor(current radio frequency communication frequency/divide-by-four frequency of the current operating frequency); and determine a quotient of current radio frequency communication frequency×4/(first positive integer+n.5) as the first operating frequency, where n is 0 or a positive integer, and a value of n enables the first operating frequency to be a frequency at which the first interface 303 can work normally.

Optionally, the processor 301 is configured to: obtain a second positive integer according to the current operating frequency and the current radio frequency communication frequency, where the second positive integer is a value of round(current radio frequency communication frequency/divide-by-four frequency of the current operating frequency);

determine a frequency difference, where the frequency difference is an absolute value of current radio frequency communication frequency−current operating frequency×second positive integer/4; and if the frequency difference is greater than a first preset value, determine the current operating frequency as the first operating frequency, where the first preset value is no less than half bandwidth of the current radio frequency communication frequency; or if the frequency difference is less than or equal to the first preset value, determine that a new operating frequency is a product of (current radio frequency communication frequency+second preset value)×4/second positive integer, and determine the new operating frequency as the first operating frequency, where the second preset value is greater than or equal to the first preset value.

Optionally, the processor 301 is further configured to: before determining the new operating frequency as the first operating frequency, determine that a difference between the new operating frequency and a supported minimum frequency is less than or equal to frequency bandwidth to which the first interface 303 can be changed.

Optionally, the current communication frequency is the current radio frequency communication frequency and a frequency set of a current neighboring cell, and the processor 301 is configured to determine the first operating frequency according to a current operating frequency of the first interface 303, the current radio frequency communication frequency, and the frequency set, so that the current radio frequency communication frequency is in a non-frequency multiplication relationship with the divide-by-four frequency of the first operating frequency and the multiplied frequency of the divide-by-four frequency.

Optionally, the processor 301 is configured to: obtain a first positive integer according to the current operating frequency and the current radio frequency communication frequency, where the first positive integer is a value of floor(current radio frequency communication frequency/divide-by-four frequency of the current operating frequency);

obtain a first lower limit value and a first upper limit value, where the first upper limit value is a value of (current radio frequency communication frequency−second preset value)×4/first positive integer, and the first lower limit value is a value of (current radio frequency communication frequency+second preset value)×4/(first positive integer+1);

determine a frequency difference, where the frequency difference is a quotient of First preset value×4/first positive integer, the first preset value is no less than half bandwidth of the current radio frequency communication frequency, and the second preset value is greater than or equal to the first preset value;

determine a new frequency set according to the frequency set, the first positive integer, the current radio frequency communication frequency, and the current operating frequency, where the new frequency set is the frequency set×4/(first positive integer+1+floor(the frequency set−current communication frequency)/divide-by-four frequency of the current operating frequency);

remove, in a first interval from the first lower limit value to the first upper limit value, a second interval whose lower limit endpoint value is a difference between the new frequency set and the frequency difference and whose upper limit endpoint value is a sum of the new frequency set and the frequency difference; and if a remaining frequency set within the first interval is not empty, determine, as the first operating frequency, a frequency that is in the remaining frequency set and that is the closest to an average of the first lower limit value and first upper limit value.

Optionally, the current radio frequency communication frequency and the frequency set form a large frequency set, and the processor 301 is configured to: determine a divide-by-four frequency of the current operating frequency;

determine a second positive integer that is consistent with a quantity of frequencies in the large frequency set, where the second positive integer is a value of floor(frequency in the large frequency set/divide-by-four frequency)+1;

determine a frequency difference between each frequency in the large frequency set and a multiplied frequency of a next divide-by-four frequency of the current operating frequency, where the frequency difference is a value of (current operating frequency×second positive integer−frequency corresponding to the second positive integer) % divide-by-four frequency;

if the frequency difference is greater than a first preset value and less than a difference between the divide-by-four frequency and the first preset value, determine the current operating frequency as the first operating frequency, where the first preset value is no less than half bandwidth of the current radio frequency communication frequency; or if the frequency difference is less than or equal to the first preset value, or the frequency difference is greater than or equal to the difference between the divide-by-four frequency and the first preset value, determine that a new operating frequency is (frequency corresponding to the frequency difference+second preset value)×4/second positive integer corresponding to the frequency difference, where the second preset value is greater than or equal to the first preset value; and determine the new operating frequency as the first operating frequency.

Optionally, the processor 301 is further configured to: before determining the new operating frequency as the first operating frequency, determine that a difference between the new operating frequency and a supported minimum frequency is less than or equal to frequency bandwidth to which the first interface 303 can be changed.

Various variations and specific examples in the interference reduction method in the foregoing embodiment shown in FIG. 1 are also applicable to the electronic device in this embodiment. According to the detailed description of the foregoing interference reduction method, a person skilled in the art may clearly understand an implementation method of the electronic device in this embodiment. Therefore, for conciseness of the specification, details are not described herein.

Based on a same inventive concept, the present invention further provides an electronic device, so as to implement the method shown in FIG. 3. The device is, for example, a mobile phone, a tablet computer, or a notebook computer.

Figure 5:
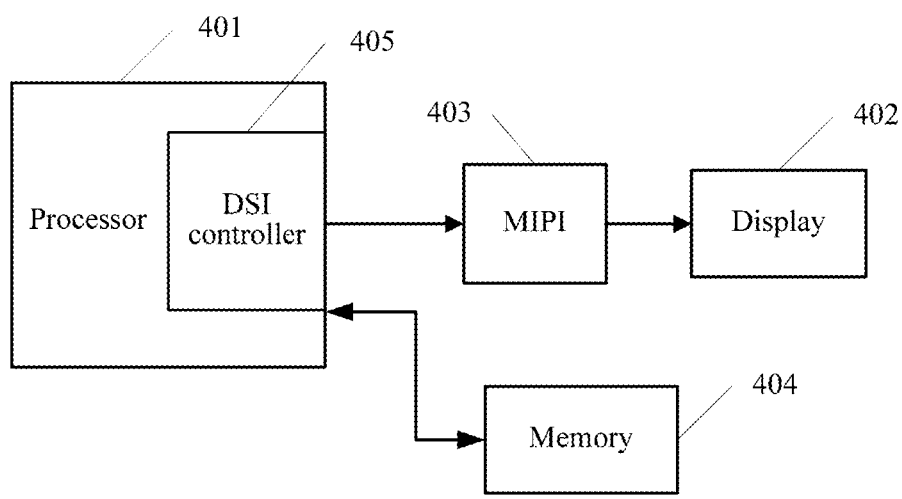
FIG. 5 is a structural block diagram of another electronic device according to an embodiment of the present invention.

Referring to FIG. 5, the electronic device includes a processor 401, a display 402, a MIPI 403, a memory 404, and a DSI controller 405. The processor 401 may be specifically a central processing unit or an application-specific integrated circuit (English: Application Specific Integrated Circuit, ASIC for short), or may be one or more integrated circuits used to control program execution, or may be a hardware circuit developed by using a field programmable gate array (English: Field Programmable Gate Array, FPGA for short), or may be a baseband chip. There may be one or more memories 404. The memory 404 may include a read only memory (English:

Read Only Memory, ROM for short), a random access memory (English: Random Access Memory, RAM for short), and a magnetic disk memory.

These memories 404 may be connected to the processor 401 by using a bus.

The DSI controller 405 may be integrated into the processor 401, or may be a separate component.

The MIPI 403 is used for data transmission between internal components of the electronic device. For example, the MIPI is configured to connect the processor 401 to the display 402, or is configured to connect the processor 401 to a camera.

Specifically, the processor 401 is configured to: receive an operating frequency switching instruction, where the switching instruction includes a new operating frequency of the MIPI 403; restart the DSI controller 405 when the display 402 enters a blanking zone, so as to clear configuration information of a time sequence register of the DSI controller 405; calculate new configuration information of the time sequence register according to the new operating frequency; and configure the time sequence register according to the new configuration information.

Optionally, the processor 401 is further configured to: disable interrupt enable before restarting the DSI controller 405, and enable the interrupt enable after configuring the time sequence register according to the new configuration information.

Various variations and specific examples in the operating frequency switching method in the foregoing embodiment shown in FIG. 3 are also applicable to the electronic device in this embodiment. According to the detailed description of the foregoing interference reduction method, a person skilled in the art may clearly understand an implementation method of the electronic device in this embodiment. Therefore, for conciseness of the specification, details are not described herein.

Based on a same inventive concept, an embodiment of the present invention further provides an interference reduction apparatus, so as to implement the method shown in FIG. 1.

Figure 6:
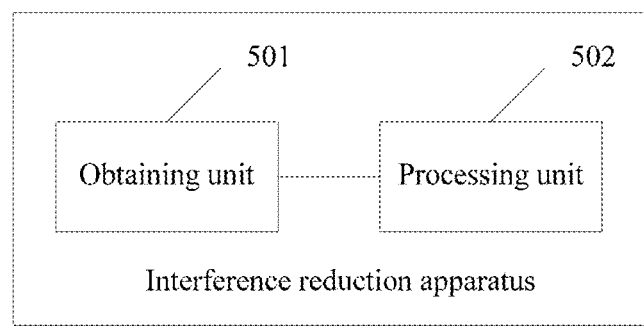
FIG. 6 is a functional block diagram of an interference reduction apparatus according to an embodiment of the present invention.

As shown in FIG. 6, the apparatus includes: an obtaining unit 501, configured to obtain a current communication frequency of a radio frequency system of an electronic device; and a processing unit 502, configured to determine a first operating frequency of a first interface of the electronic device according to the current communication frequency, so that a current radio frequency communication frequency of a current serving cell of the radio frequency system is in a non-frequency multiplication relationship with a divide-by-four frequency of the first operating frequency and a multiplied frequency of the divide-by-four frequency.

Optionally, the current communication frequency includes the current radio frequency communication frequency, and the processing unit 502 is configured to: determine, in N preset interference sets, a first interference set that has no intersection with the current radio frequency communication frequency, where each interference set includes a divide-by-four frequency of a corresponding preset frequency and a multiplied frequency of the divide-by-four frequency, and N is a positive integer greater than or equal to 2; and determine a preset frequency corresponding to the first interference set as the first operating frequency.

Optionally, the processing unit 502 is configured to determine, as the first interference set, an interference set in the N interference sets that has an intersection with neither the current radio frequency communication frequency nor a frequency set, where the frequency set is a frequency set of a current neighboring cell of the radio frequency system or a frequency set of a current serving cell of a secondary card in the radio frequency system.

Optionally, the processing unit 502 is configured to: if there is no interference set that has an intersection with neither the current radio frequency communication frequency nor the frequency set, determine, as the first interference set, an interference set in the N interference sets that has no intersection with the current radio frequency communication frequency and has fewest intersections with the frequency set.

Optionally, the corresponding preset frequency is set for each interference set, so that there is always at least one interference set in the N interference sets that has no intersection with the current radio frequency communication frequency.

Optionally, the current communication frequency is the current radio frequency communication frequency, and the processing unit 502 is configured to determine the first operating frequency according to a current operating frequency of the first interface and the current radio frequency communication frequency, so that the current radio frequency communication frequency is in a non-frequency multiplication relationship with the divide-by-four frequency of the first operating frequency and the multiplied frequency of the divide-by-four frequency.

Optionally, the processing unit 502 is configured to: obtain a first positive integer according to the current operating frequency and the current radio frequency communication frequency, where the first positive integer is a value of floor(current radio frequency communication frequency/divide-by-four frequency of the current operating frequency); and determine a quotient of current radio frequency communication frequency×4/(first positive integer+n.5) as the first operating frequency, where n is 0 or a positive integer, and a value of n enables the first operating frequency to be a frequency at which the first interface can work normally.

Optionally, the processing unit 502 is configured to: obtain a second positive integer according to the current operating frequency and the current radio frequency communication frequency, where the second positive integer is a value of round(current radio frequency communication frequency/divide-by-four frequency of the current operating frequency);

determine a frequency difference, where the frequency difference is an absolute value of current radio frequency communication frequency−current operating frequency× second positive integer/4; and if the frequency difference is greater than a first preset value, determine the current operating frequency as the first operating frequency, where the first preset value is no less than half bandwidth of the current radio frequency communication frequency; or if the frequency difference is less than or equal to the first preset value, determine that a new operating frequency is a product of (current radio frequency communication frequency+second preset value)×4/second positive integer, and determine the new operating frequency as the first operating frequency, where the second preset value is greater than or equal to the first preset value.

Optionally, the processing unit 502 is further configured to: before determining the new operating frequency as the first operating frequency, determine that a difference between the new operating frequency and a supported minimum frequency is less than or equal to frequency bandwidth to which the first interface can be changed.

Optionally, the current communication frequency is the current radio frequency communication frequency and a frequency set of a current neighboring cell, and the processing unit 502 is configured to determine the first operating frequency according to a current operating frequency of the first interface, the current radio frequency communication frequency, and the frequency set, so that the current radio frequency communication frequency is in a non-frequency multiplication relationship with the divide-by-four frequency of the first operating frequency and the multiplied frequency of the divide-by-four frequency.

Optionally, the processing unit 502 is configured to: obtain a first positive integer according to the current operating frequency and the current radio frequency communication frequency, where the first positive integer is a value of floor(current radio frequency communication frequency/divide-by-four frequency of the current operating frequency);

obtain a first lower limit value and a first upper limit value, where the first upper limit value is a value of (current radio frequency communication frequency−second preset value)×4/first positive integer, and the first lower limit value is a value of (current radio frequency communication frequency+second preset value)×4/(first positive integer+1);

determine a frequency difference, where the frequency difference is a quotient of First preset value×4/first positive integer, the first preset value is no less than half bandwidth of the current radio frequency communication frequency, and the second preset value is greater than or equal to the first preset value;

determine a new frequency set according to the frequency set, the first positive integer, the current radio frequency communication frequency, and the current operating frequency, where the new frequency set is the frequency set×4/(first positive integer+1+floor(the frequency set−current communication frequency)/divide-by-four frequency of the current operating frequency);

remove, in a first interval from the first lower limit value to the first upper limit value, a second interval whose lower limit endpoint value is a difference between the new frequency set and the frequency difference and whose upper limit endpoint value is a sum of the new frequency set and the frequency difference; and if a remaining frequency set within the first interval is not empty, determine, as the first operating frequency, a frequency that is in the remaining frequency set and that is the closest to an average of the first lower limit value and first upper limit value.

Optionally, the current radio frequency communication frequency and the frequency set form a large frequency set, and the processing unit 502 is configured to: determine a divide-by-four frequency of the current operating frequency; determine a second positive integer that is consistent with a quantity of frequencies in the large frequency set, where the second positive integer is a value of floor(frequency in the large frequency set/divide-by-four frequency)+1; determine a frequency difference between each frequency in the large frequency set and a multiplied frequency of a next divide-by-four frequency of the current operating frequency, where the frequency difference is a value of (current operating frequency×second positive integer−frequency corresponding to the second positive integer) % divide-by-four frequency; if the frequency difference is greater than a first preset value and less than a difference between the divide-by-four frequency and the first preset value, determine the current operating frequency as the first operating frequency, where the first preset value is no less than half bandwidth of the current radio frequency communication frequency; or if the frequency difference is less than or equal to the first preset value, or the frequency difference is greater than or equal to the difference between the divide-by-four frequency and the first preset value, determine that a new operating frequency is (frequency corresponding to the frequency difference+second preset value)×4/second positive integer corresponding to the frequency difference, where the second preset value is greater than or equal to the first preset value; and determine the new operating frequency as the first operating frequency.

Optionally, the processing unit 502 is further configured to: before determining the new operating frequency as the first operating frequency, determine that a difference between the new operating frequency and a supported minimum frequency is less than or equal to frequency bandwidth to which the first interface can be changed.

Various variations and specific examples in the interference reduction method in the foregoing embodiment shown in FIG. 1 are also applicable to the interference reduction apparatus in this embodiment. According to the detailed description of the foregoing interference reduction method, a person skilled in the art may clearly understand an implementation method of the interference reduction apparatus in this embodiment. Therefore, for conciseness of the specification, details are not described herein.

Based on a same inventive concept, an embodiment of the present invention further provides an operating frequency switching apparatus, so as to implement the method shown in FIG. 3.

Figure 7:
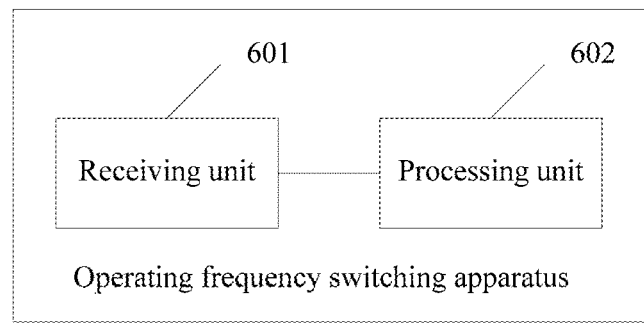
FIG. 7 is a flowchart of an operating frequency switching apparatus according to an embodiment of the present invention.

As shown in FIG. 7, the switching apparatus includes: a receiving unit 601, configured to receive an operating frequency switching instruction, where the switching instruction includes a new operating frequency of a mobile industry processor interface MIPI; a processing unit 602, configured to: restart a DSI controller when a display enters a blanking zone, so as to clear configuration information of a time sequence register of the DSI controller; calculate new configuration information of the time sequence register according to the new operating frequency; and configure the time sequence register according to the new configuration information.

Optionally, the processing unit 602 is further configured to: disable interrupt enable before restarting the DSI controller, and enable the interrupt enable after configuring the time sequence register according to the new configuration information.

Various variations and specific examples in the operating frequency switching method in the foregoing embodiment shown in FIG. 3 are also applicable to the operating frequency switching apparatus in this embodiment. According to the detailed description of the foregoing operating frequency switching method, a person skilled in the art may clearly understand an implementation method of the operating frequency switching apparatus in this embodiment. Therefore, for conciseness of the specification, details are not described herein.

One or more technical solutions provided in the embodiments of this application have at least the following technical effects or advantages:

In this embodiment of the present invention, a current communication frequency of a radio frequency system of an electronic device is obtained, and a first operating frequency of a first interface of the electronic device is determined according to the current communication frequency, so that a current radio frequency communication frequency of a current serving cell of the radio frequency system is in a non-frequency multiplication relationship with a divide-by-four frequency of the first operating frequency and a multiplied frequency of the divide-by-four frequency. In other words, according to the method in this embodiment of the present invention, a first operating frequency of a first interface is determined according to a current communication frequency, so that a current radio frequency communication frequency is in a non-frequency multiplication relationship with a divide-by-four frequency of the first operating frequency and a multiplied frequency of the divide-by-four frequency. In this way, when the first interface works at the first operating frequency, the divide-by-four frequency of the first operating frequency and the multiplied frequency of the divide-by-four frequency cause no interference to the current radio frequency communication frequency.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. An interference reduction method, comprising:
    obtaining a current radio frequency communication frequency of a radio frequency system of an electronic device;
    determining, in N preset interference sets, a first interference set that has no intersection with the current radio frequency communication frequency, wherein each of the N preset interference sets comprises a multiple of a divide-by-four frequency of a corresponding preset frequency, and N is a positive integer greater than or equal to 2;
    determining a preset frequency corresponding to the first interference set as a first operating frequency of a first interface of the electronic device; and
    switching a current operating frequency of the first interface to the first operating frequency.

2. The method according to claim 1, wherein the determining, in N preset interference sets, a first interference set that has no intersection with the current radio frequency communication frequency comprises:
    determining, as the first interference set, an interference set in the N preset interference sets that has an intersection with neither the current radio frequency communication frequency nor a first frequency set, wherein the first frequency set is a frequency set of a current neighboring cell of the radio frequency system or a frequency set of a current serving cell of a secondary card in the radio frequency system.

3. The method according to claim 1, wherein the determining, in N preset interference sets, a first interference set that has no intersection with the current radio frequency communication frequency further comprises:
    if there is no interference set that has an intersection with neither the current radio frequency communication frequency nor the first frequency set, determining, as the first interference set, an interference set in the N interference sets that has no intersection with the current radio frequency communication frequency and has fewest intersections with the first frequency set.

4. The method according to claim 1, wherein the corresponding preset frequency is set for each interference set, and there is at least one interference set in the N preset interference sets that has no intersection with the current radio frequency communication frequency.

5. The method according to claim 2, wherein the corresponding preset frequency is set for each interference set, wherein there is at least one interference set in the N interference sets that has no intersection with the current radio frequency communication frequency.

6. The method according to claim 3, wherein the corresponding preset frequency is set for each interference set, wherein there is at least one interference set in the N interference sets that has no intersection with the current radio frequency communication frequency.

7. An interference reduction method, comprising:
    obtaining a current radio frequency communication frequency of a radio frequency system of an electronic device;
    obtaining a first positive integer according to a current operating frequency of the first interface and the current radio frequency communication frequency, wherein the first positive integer is a value of floor(current radio frequency communication frequency/divide-by-four frequency of the current operating frequency);
    determining a quotient of the current radio frequency communication frequency×4/(the first positive integer+n·5) as a first operating frequency of a first interface of the electronic device, wherein n is 0 or a positive integer, and a value of n enables the first interface work normally at the first operating frequency; and
    switching the current operating frequency of the first interface to the first operating frequency.

8. The method according to claim 7, the method further comprises:
    determining that a difference between the first operating frequency and a supported minimum frequency is less than or equal to an changeable frequency bandwidth of the first interface.

9. An electronic device, comprising:
    a radio frequency system for communication between the electronic device and an external electronic device;
    a first interface for data transmission between internal components of the electronic device;
    at least one processor; and
    a non-transitory computer-readable storage medium coupled to the at least one processor and storing programming instructions for execution by the at least one processor, the programming instructions instruct the at least one processor to:
    obtain a current radio frequency communication frequency of the radio frequency system;
    determine, in N preset interference sets, a first interference set that has no intersection with the current radio frequency communication frequency, wherein each of the N preset interference sets comprises a multiple of a divide-by-four frequency of a corresponding preset frequency, and N is a positive integer greater than or equal to 2;
    determine a preset frequency corresponding to the first interference set as a first operating frequency of the first interface of the electronic device; and
    switch a current operating frequency of the first interface to the first operating frequency.

10. The electronic device according to claim 9, wherein the programming instructions instruct the at least one processor to:
    determine, as the first interference set, an interference set in the N preset interference sets that has an intersection with neither the current radio frequency communication frequency nor a first frequency set, wherein the first frequency set is a frequency set of a current neighboring cell of the radio frequency system or a frequency set of a current serving cell of a secondary card in the radio frequency system.

11. The electronic device according to claim 10, wherein the programming instructions instruct the at least one processor to:
  if there is no interference set that has an intersection with neither the current radio frequency communication frequency nor the first frequency set, determine, as the first interference set, an interference set in the N interference sets that has no intersection with the current radio frequency communication frequency and has fewest intersections with the first frequency set.

12. The electronic device according to claim 9, wherein the corresponding preset frequency is set for each interference set, and there is at least one interference set in the N preset interference sets that has no intersection with the current radio frequency communication frequency.

13. The electronic device according to claim 10, wherein the corresponding preset frequency is set for each interference set, and there is at least one interference set in the N preset interference sets that has no intersection with the current radio frequency communication frequency.

14. The electronic device according to claim 11, wherein the corresponding preset frequency is set for each interference set, and there is at least one interference set in the N preset interference sets that has no intersection with the current radio frequency communication frequency.

\* \* \* \* \*